US011560784B2

(12) United States Patent
Sengul et al.

(10) Patent No.: US 11,560,784 B2
(45) Date of Patent: Jan. 24, 2023

(54) AUTOMATED BEAM PUMP DIAGNOSTICS USING SURFACE DYNACARD

(71) Applicant: Noven, Inc., Houston, TX (US)

(72) Inventors: Mahmut Sengul, Houston, TX (US); Mario Ruscev, Houston, TX (US); Juan Felipe Arjona, Houston, TX (US); Vyacheslav Nadovoretskiy, Houston, TX (US); Hanna Broadus, Houston, TX (US)

(73) Assignee: NOVEN, INC., Houston, TX (US)

( * ) Notice: Subject to any disclaimer, the term of this patent is extended or adjusted under 35 U.S.C. 154(b) by 231 days.

(21) Appl. No.: 16/898,019

(22) Filed: Jun. 10, 2020

(65) Prior Publication Data

US 2020/0392833 A1 Dec. 17, 2020

Related U.S. Application Data

(60) Provisional application No. 62/859,997, filed on Jun. 11, 2019, provisional application No. 62/860,012, filed on Jun. 11, 2019.

(51) Int. Cl.
*E21B 47/009* (2012.01)
*G06N 20/00* (2019.01)
*F04B 51/00* (2006.01)

(52) U.S. Cl.
CPC ........... *E21B 47/009* (2020.05); *G06N 20/00* (2019.01); *F04B 51/00* (2013.01)

(58) Field of Classification Search
CPC ........ E21B 47/009; G06N 20/00; F04B 51/00
See application file for complete search history.

(56) References Cited

U.S. PATENT DOCUMENTS

| | | |
|---|---|---|
| 3,343,409 A | 9/1967 | Gibbs |
| 3,635,081 A | 1/1972 | Gibbs |
| 3,951,209 A | 4/1976 | Gibbs |
| 4,490,094 A | 12/1984 | Gibbs |
| 4,509,901 A | 4/1985 | McTamaney et al. |
| 4,793,178 A | 12/1988 | Ahern et al. |
| 4,932,253 A | 6/1990 | McCoy |
| 5,031,228 A | 7/1991 | Lu |
| 5,252,031 A | 10/1993 | Gibbs |
| 5,464,058 A | 11/1995 | McCoy et al. |
| 5,497,430 A | 3/1996 | Sadovnik et al. |
| 5,715,325 A | 2/1998 | Bang et al. |
| 5,941,305 A | 8/1999 | Thrasher et al. |

(Continued)

FOREIGN PATENT DOCUMENTS

| | | |
|---|---|---|
| AU | 2004316883 B2 | 7/2008 |
| EP | 3118409 B1 | 2/2018 |

(Continued)

*Primary Examiner* — Charles G Freay
(74) *Attorney, Agent, or Firm* — MH2 Technology Law Group LLP

(57) ABSTRACT

A method for detecting operational issues in a beam pump unit includes receiving sensor data representing a position of and a load on the beam pump unit, using a sensor coupled to the beam pump unit, generating a surface dynacard based on the sensor data, predicting a source of inefficiency in the beam pump unit based at least in part on the surface dynacard using a machine learning algorithm, and identifying one or more corrective actions to take to address the source of inefficiency.

20 Claims, 13 Drawing Sheets

(56) References Cited

U.S. PATENT DOCUMENTS

| | | |
|---|---|---|
| 6,176,682 B1 | 1/2001 | Mills |
| 6,553,131 B1 | 4/2003 | Neubauer et al. |
| 6,763,148 B1 | 7/2004 | Sternberg et al. |
| 7,634,328 B2 | 12/2009 | Medizade et al. |
| 8,157,537 B2 | 4/2012 | Chavez |
| 8,208,764 B2 | 6/2012 | Guckenberger |
| 8,444,393 B2 | 5/2013 | Beck et al. |
| 9,080,438 B1 | 7/2015 | McCoy et al. |
| 9,506,751 B2 | 11/2016 | Zhao |
| 9,983,076 B2 | 5/2018 | Zhao |
| 2004/0144529 A1 | 7/2004 | Barnes et al. |
| 2008/0143512 A1 | 6/2008 | Wakisaka et al. |
| 2008/0240930 A1 | 10/2008 | Palka et al. |
| 2012/0020808 A1 | 1/2012 | Lawson et al. |
| 2012/0191633 A1* | 7/2012 | Liu ................ E21B 47/008 706/12 |
| 2013/0030721 A1 | 1/2013 | Palka et al. |
| 2013/0115104 A1 | 5/2013 | Pons |
| 2013/0115107 A1 | 5/2013 | Pons |
| 2013/0127390 A1 | 5/2013 | Dacunha et al. |
| 2013/0151216 A1 | 6/2013 | Palka et al. |
| 2013/0277063 A1 | 10/2013 | Palka |
| 2013/0333880 A1 | 12/2013 | Raglin et al. |
| 2015/0176395 A1* | 6/2015 | McCoy ................ E21B 41/0092 702/6 |
| 2015/0308257 A1 | 10/2015 | McCoy et al. |
| 2015/0345280 A1 | 12/2015 | Krauss |
| 2017/0002635 A1 | 1/2017 | Williams et al. |
| 2017/0030348 A1 | 2/2017 | Mills |
| 2017/0159422 A1 | 6/2017 | McCoy |
| 2017/0235284 A1* | 8/2017 | Watson ................ E21B 47/008 700/31 |
| 2017/0306745 A1* | 10/2017 | Harding ................ F04B 47/028 |
| 2020/0150620 A1* | 5/2020 | Gray ................ G05B 19/4183 |

FOREIGN PATENT DOCUMENTS

| | | |
|---|---|---|
| WO | 2009/005876 A2 | 1/2009 |
| WO | 2010/051270 A1 | 5/2010 |

* cited by examiner

AUTOMATED BEAM PUMP DIAGNOSTICS USING SURFACE DYNACARD

CROSS-REFERENCE TO RELATED APPLICATIONS

This application claims priority to U.S. Provisional Patent Application Ser. No. 62/859,912, which was filed on Jun. 11, 2019, and to U.S. Provisional Patent Application Ser. No. 62/860,012, which was filed on Jun. 11, 2019. Each of these priority applications is incorporated herein by reference in its entirety.

BACKGROUND

Beam pumps are used to provide artificial lift in wells, allowing producing of hydrocarbons from the wells. The method is popular because of its simplicity, reliability, and applicability to a wide range of operating conditions. However, beam pumps are prone to inefficiency from a variety of issues that can be difficult to diagnose. Well shutdowns caused by delayed equipment diagnostics may result in lost production and health, safety, and environmental (HSE) issues. The ability to identify beam pumping operating conditions may thus enhance oil well profitability over the long-term.

Accordingly, beam pump operation is sometimes monitored using sensors. For example, beam pumps include a polished rod that is moved up and down, so as to pressurize the well as part of the downhole system. The load on the polished rod, e.g., at the top, where it extends above the well, may be measured by a load cell between the carrier bar and the polished rod clamp, which form the connection between the polished rod and the surface pumping components. The position of the stroke (e.g., vertical position of the polished rod) is measured by a position indicator. Position can also be checked by a one-point pickup as the crank driven by the prime mover for the pump passes a sensor during the pumping cycle.

A plot of the position of the polished rod versus the load on the polished rod is called a dynamometer card or "dynacard." When the measurements forming the dynacard are taken at the surface, the dynacard is called a "surface dynacard." Surface dynacards have the advantage of being relatively easy to compile, because the data is measured at the surface. However, operators and engineers are often more interested in the conditions downhole.

Accordingly, the "wave equation" was developed to relate the surface dynacard to downhole conditions. By using the wave equation, the dynamic load responses in the rod assembly that connects the surface unit to the downhole unit can be filtered out, thus allowing the downhole conditions to be inferred from the surface conditions. However, there remains a high degree of uncertainty associated with such wave equation calculations, as the surface system is not being evaluated, but rather its dynamic response to the downhole environment during operation is evaluated to infer details of the downhole environment itself. Furthermore, the wave equation generally calls for a detailed knowledge of the structure of the well and the beam pump, which varies between wells. As such, separate calculations are performed for each well, which limits the general applicability of systems that employ the surface dynacard via the wave equation as between different wells.

SUMMARY

A method for detecting operational issues in a beam pump unit is disclosed. The method includes receiving sensor data representing a position of and a load on the beam pump unit using a sensor coupled to the beam pump unit, generating a surface dynacard based on the sensor data, predicting a source of inefficiency in the beam pump unit based at least in part on the surface dynacard using a machine learning algorithm, and identifying one or more corrective actions to take to address the source of inefficiency.

A system is disclosed. The system includes one or more sensors coupled to a beam pump unit. The one or more sensors are configured to measure sensor data representing a position of and a load on the beam pump unit during operation thereof. The system also includes one or more processors in communication with the sensor, and a memory system including one or more non-transitory, computer-readable media storing instructions that, when executed by at least one of the one or more processors, cause the system to perform operations. The operations include receiving the sensor data from the sensor, generating a surface dynacard based on the sensor data, predicting a source of inefficiency in the beam pump unit based at least in part on the surface dynacard using a machine learning algorithm, and identifying one or more corrective actions to take to address the source of inefficiency.

A non-transitory, computer-readable medium is also disclosed. The medium stores instructions that, when executed by at least one processor of a computing system, cause the computing system to perform operations. The operations include receiving sensor data representing a position of and a load on a beam pump unit, using a sensor coupled to the beam pump unit, generating a surface dynacard based on the sensor data, predicting a source of inefficiency in the beam pump unit based at least in part on the surface dynacard using a machine learning algorithm, and identifying one or more corrective actions to take to address the source of inefficiency.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
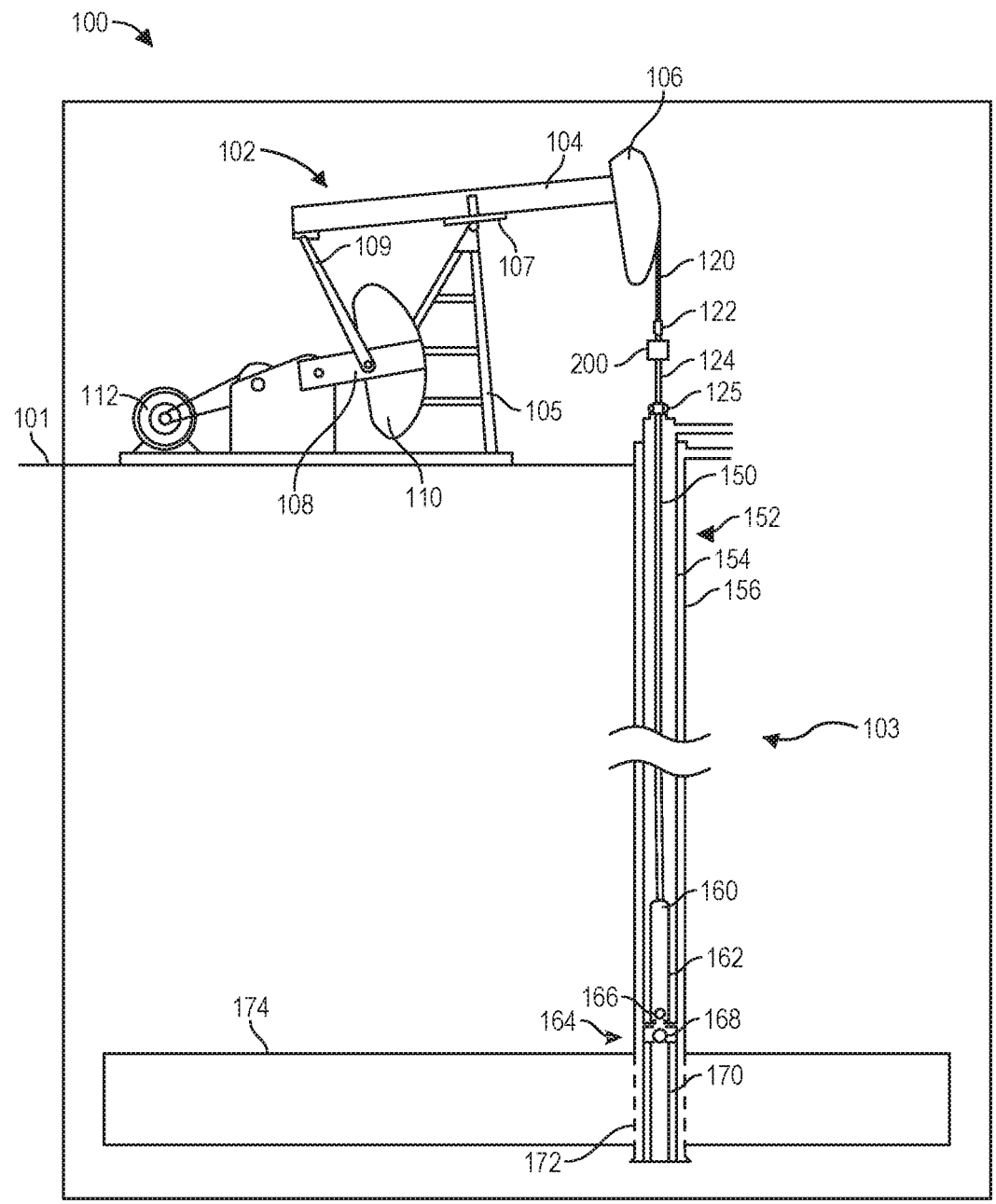
FIG. 1 illustrates a schematic view of a beam pump unit, according to an embodiment.

FIG. 1 illustrates a schematic view of a beam pump unit 100, according to an embodiment. The beam pump unit 100 may include a surface system 102 and a downhole system 103. The surface system 102 may include a walking beam 104 having a horsehead 106 connected at a distal end thereto. The walking beam 104 may be supported from the ground 101 by a samson post 105 connected to the walking beam 104 via a center bearing 107. At a proximal end of the walking beam 104, a pitman arm 109 may connect the walking beam 104 to a crank arm 108. The crank arm 108 may include a counterbalance weight 110, and may be driven by a prime mover 112, such as an internal-combustion engine. The prime mover 112 causes the crank arm 108 to move through an arc, generally up and down with respect to the ground 101. In turn, this drives the walking beam 104 to pivot about the center bearing 107, causing the horsehead 106 to move through an arc, generally up-and-down with respect to the ground 101.

A bridle 120 may be coupled to the horsehead 106, and may be connected via a carrier bar 122 to a polished rod 124. The polished rod 124 may connect the surface system 102 with the downhole system 103. A stuffing box 125 (and/or other components of a wellhead) may prevent egress of fluids, gasses, etc. from the downhole system 103 along the polished rod 124. The downhole system 103 may include sucker rods 150 that extend down through a wellbore 152, e.g., through production tubing 154 and a casing 156 disposed in the wellbore 152. A plunger 160 may be connected to a lower end of the sucker rods 150. The plunger 160 may fit into a pump barrel 162, and a valve system 164 (e.g., a travelling valve 166 and a standing valve 168) may be positioned at or near to the lower end of the sucker rods 150. A gas anchor 170 may be positioned at the bottom of the wellbore 152, e.g., near perforations 172 formed therein, which may provide a communication path for fluids, e.g., hydrocarbons, in a subterranean reservoir 174. Accordingly, as the surface system 102 operates to move the horsehead 106 up and down, this movement is transmitted via the bridle 120, carrier bar 122, and polished rod 124 to the sucker rods 150. In turn, the sucker rods 150 apply pressure into the wellbore 152, which tends to draw fluid upward in the production tubing 154, enabling production of fluid, e.g., hydrocarbons, from the perforations 172 to the surface.

The polished rod 124 is configured to cycle up and down by a predetermined vertical distance, in response to movement of the horsehead 106. As mentioned above, there are a variety of ways to measure or infer the position of the polished rod 124, or a point thereof. For example, proximity sensors, optical sensors, magnetic sensors, Hall-effect sensors, etc. may be used to directly measure a position of the polished rod 124. In other embodiments, encoders, pickups, etc. attached to the prime mover 112, the crank shaft, or the like, may also be employed to measure the position of the polished rod 124. Further, sensors that are configured to measure load on the polished rod 124 may be employed, e.g., including strain gauges. In some embodiments, an integrated sensor 200 may be coupled to the polished rod 124 to measure the position of the polished rod 124, as well as the loads incident thereon. Such sensors may include strain gauges, and may be positioned between the polished rod 124 and the carrier bar 122 or attached directly to the polished rod 124. Examples of integrated sensors 200 that may be attached directly to the polished rod 124 include those disclosed in U.S. patent application Ser. Nos. 16/897, 566 and 16/897,639, which are assigned to the assignee of the present application and incorporated herein by reference in their entirety.

Figure 2:
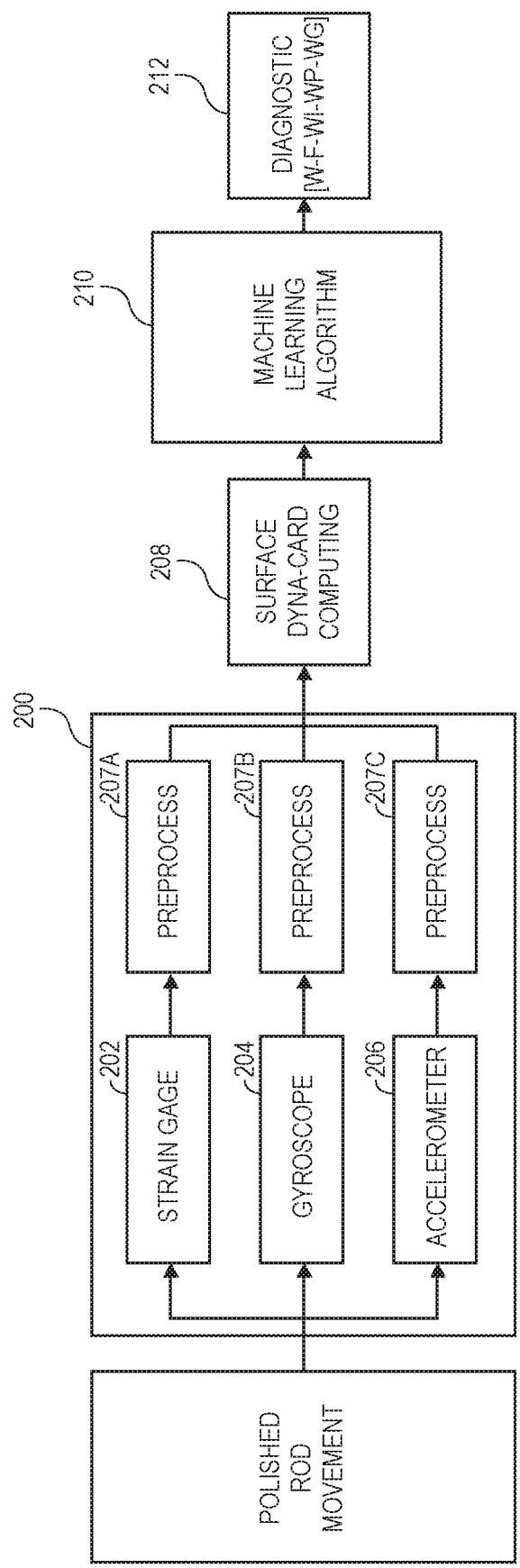
FIG. 2 illustrates a functional block diagram of the sensor system.

The integrated sensor 200 (or two or more separate sensors for measuring load and/or position) may be employed to generate a surface dynamometer card ("surface dynacard"). FIG. 2 illustrates a block diagram of the sensor system 200, according to an embodiment. As shown, the integrated sensor 200 includes a strain gauge 202, gyroscope 204, and accelerometer 206, which may be positioned on the polished rod 124 and configured to acquire load, orientation, and acceleration data over time. The signals from the sensor elements 202, 204, 206 may be preprocessed, etc., using one or more preprocessors (three are shown: 207A, 207B, 207C). For example, the raw data for the surface dynacard are load on the polished rod 124 and position of the polished rod 124 with respect to the stroke cycle. The load data may be calibrated and converted from voltage (mV) to load (klbs), and the acceleration data are converted from three-axis acceleration sensor voltage (mV) to position (in). The load and positional data are time-synchronized by the data acquisition firmware. The load data are denoised, e.g., using a median filter supplemented by an outlier-elimination technique, segmented, and interpolated with a fixed number of upstroke and downstroke points for each segmented dynacard. Then the clean segmented load and position data can be plotted against each other to produce commonly known surface dynacard.

From the orientation and acceleration data, the position of the polished rod 124 may be determined, and associated with a time ("timestamp"). Likewise, the load data (referring to load incident on the polished rod 124) may be associated with a timestamp. The load and position data may be correlated using the timestamps, and a plot of load versus position may be generated. This is the surface dynamometer card or "dynacard", as indicated at 208.

Next, as will be described in greater detail below, a machine learning (ML) algorithm 210 may be employed to detect an operating condition and/or diagnose operating issues associated with the beam pump unit and generate a diagnostic code, as at 212. The ML algorithm 210 may be trained using a training corpus of surface dynacards associated with various operation conditions, including operating normally and various different possible anomalous operations and their causes. As such, the ML algorithm 210 may be configured to recognize pump health and diagnose pumping issues using only the surface dynacard, or potentially using the surface dynacard in combination with pressure measurements of the casing head and/or tubing head. This may avoid the drawbacks of the wave equation and the structural information for the beam pump unit 100 and/or the well components, which is often needed to infer the downhole conditions from the surface system's behavior. In other embodiments, the output from the ML algorithm 210 may be combined with wave equation outputs to form a more robust interpretation of the downhole conditions based at least in part on the surface system's behavior.

Figure 3A:
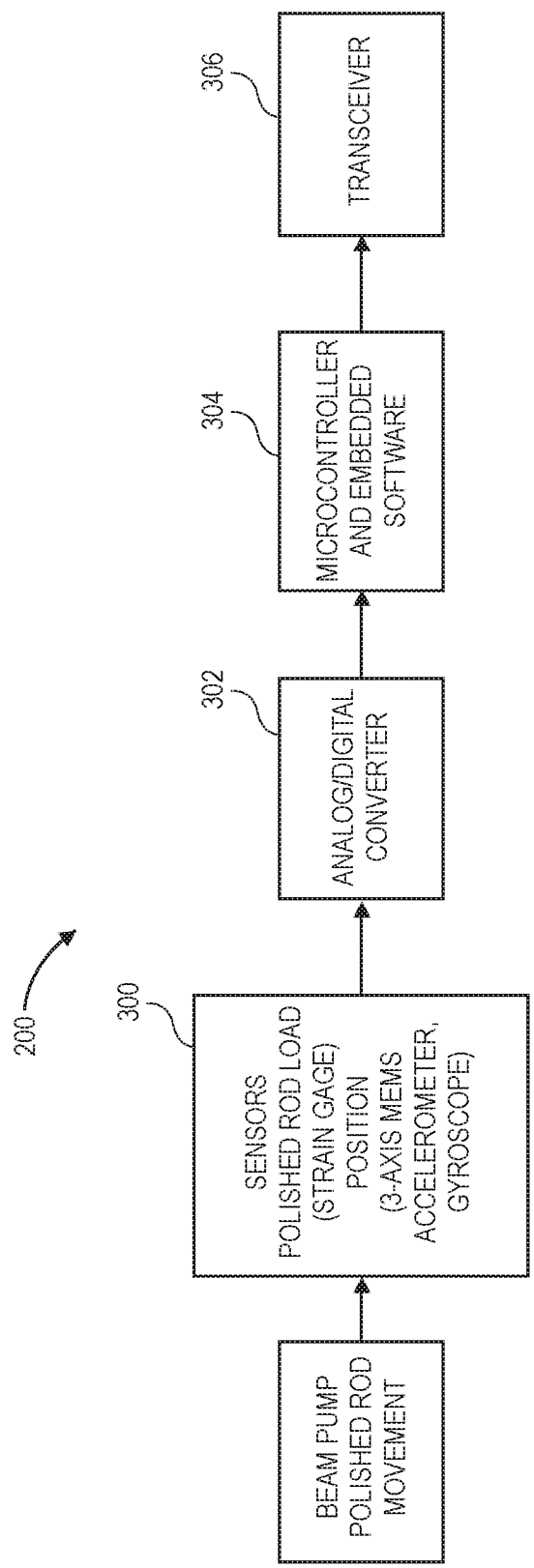
FIG. 3A illustrates a functional block diagram of a sensor system collects and analyzes beam pump unit measurements, according to an embodiment.

FIG. 3A illustrates a functional block diagram of the integrated sensor 200, according to an embodiment. The sensor 200 may acquire data from the beam pump unit 100 (e.g., the polished rod 124), as at 300, and send signals proportional to the associated data to an analog-to-digital converter 302. The digital signals may be sent to a microcontroller 304 with embedded software, and then to a transceiver 306, such as a very low power BLUETOOTH® (or WiFi, cellular, etc.) transceiver. The transceiver 306 may send the data to a computing system for further processing.

Figure 3B:
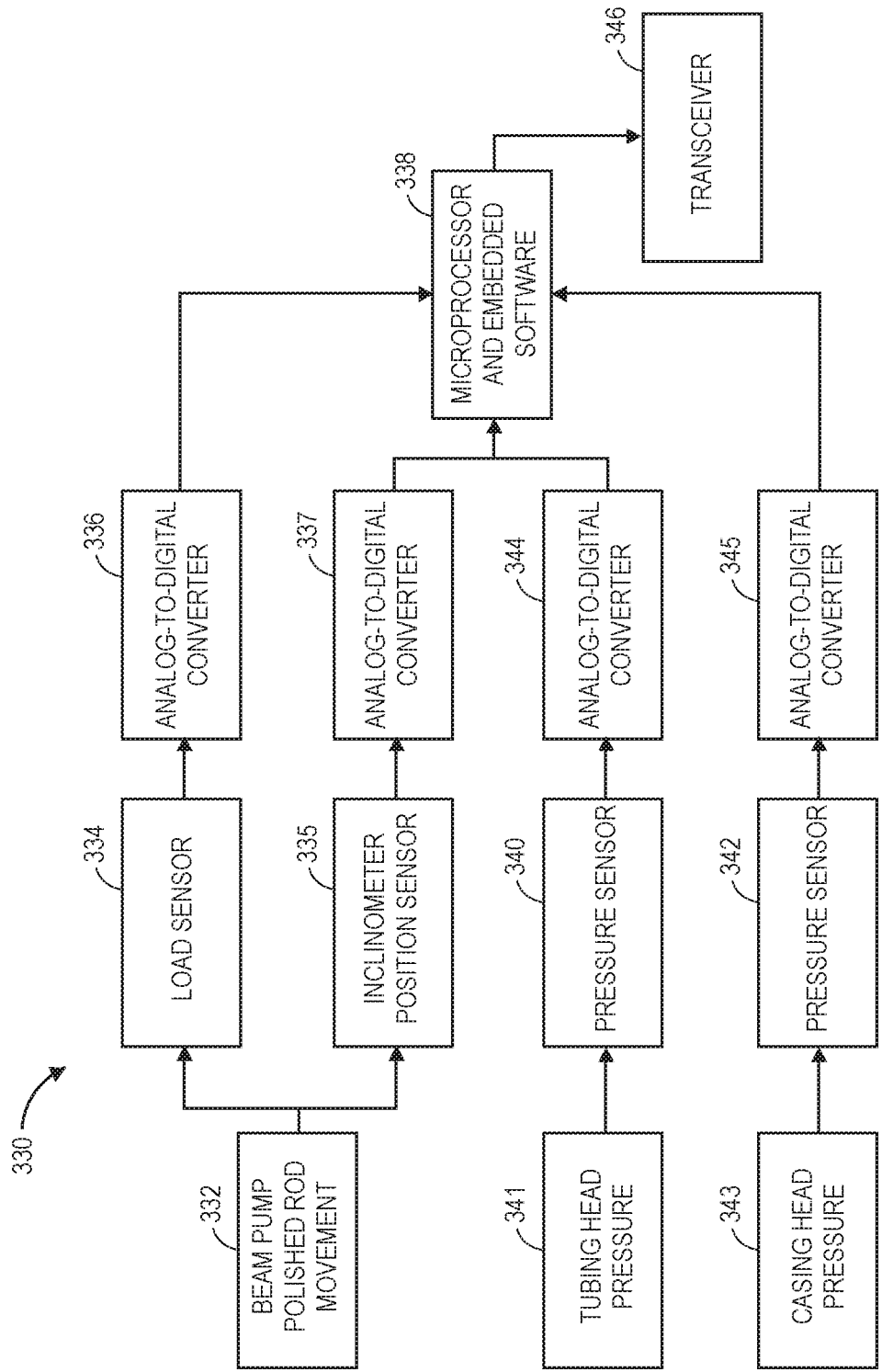
FIG. 3B illustrates a functional block diagram of a sensor system that combines beam unit measurements with pressure measurements, according to an embodiment.

FIG. 3B illustrates a functional block diagram of a sensor system 330 that may be provided on the beam pump unit 100, according to an embodiment. Beam pump polished rod movement 332 may be measured by a load sensor 334 and an inclinometer position sensor 335. For example, these measurements may be recorded using the integrated sensor 200 discussed above. These measurements may be fed to (e.g., two separate) analog-to-digital converters at 336, 337.

A pressure sensor 340 may measure tubing head pressure 341, and another pressure sensor 342 may measure casing head pressure 343. Each of these measurements may be fed to a separate analog-to-digital converter 344, 345 and to the microcontroller 338. In some embodiments, separate microcontrollers may be provided for each signal (e.g., four microcontrollers may be used), but in other embodiments a single microcontroller may be used.

The signals, after being processed by the microcontroller 338 may then be fed to a transceiver 346, e.g., a low-power BLUETOOTH® transceiver, for transmission to another computing system. It will be appreciated that a wired connection could also be used.

Figure 3C:
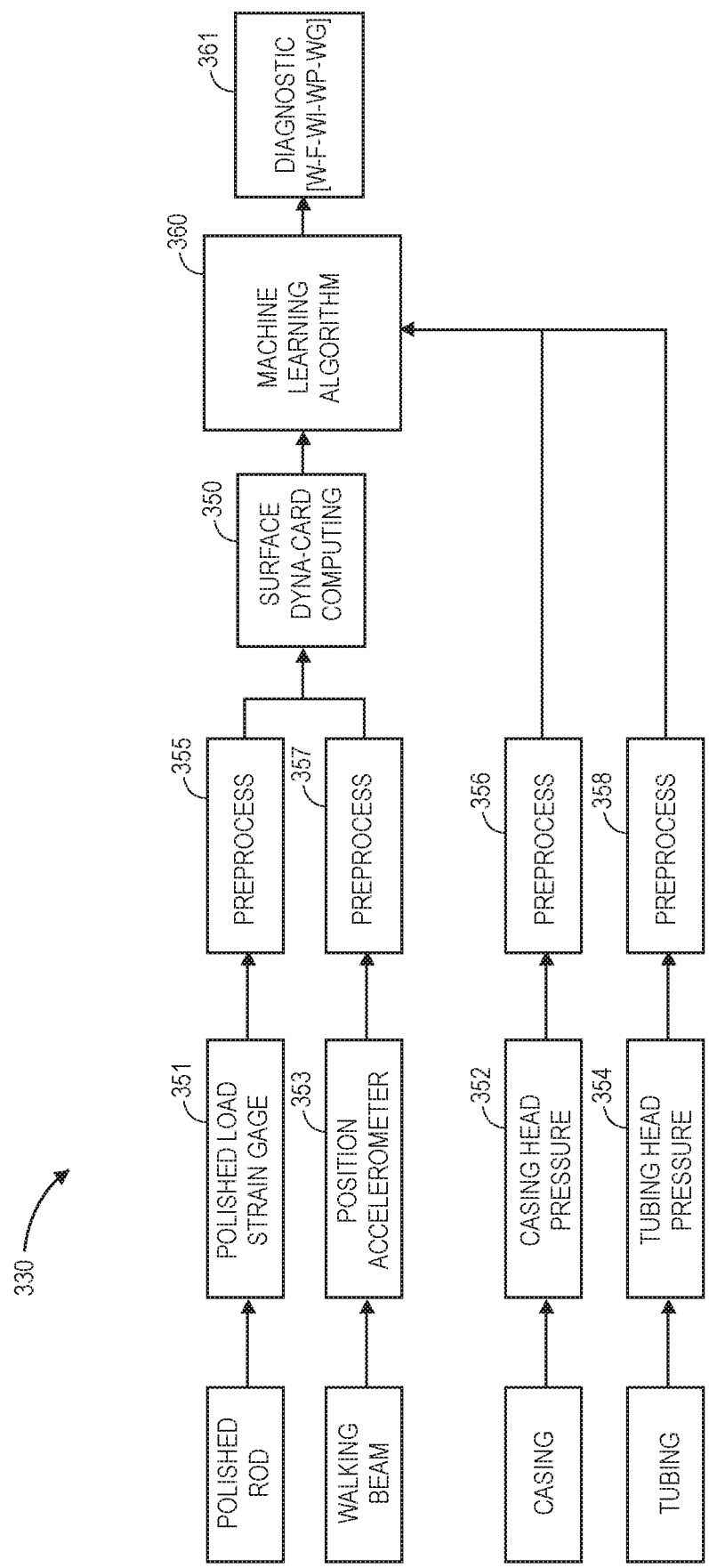
FIG. 3C illustrates a functional block diagram of a sensor system that combines beam unit measurements with pressure measurements and applies a machine learning algorithm to diagnose an operation condition and/or inefficiency source therefrom, according to an embodiment.

FIG. 3C illustrates another functional block diagram of the sensor system 330, according to an embodiment. As discussed above, the sensors system 330 may measure the load on the polished rod 124 and the walking beam 104 via a strain gauge (load sensor) and a position sensor (e.g., an accelerometer, as provided in the integrated sensor 200), as at 351 and 353, respectively. The integrated sensor 200 may thus measure surface operating conditions. The signals from the sensor 200 may be preprocessed, e.g., to remove noise or other spurious signals, as at 355, 357, and then used to create a surface dynacard, as at 350.

The sensor system 330 may also measure casing head pressure and tubing head pressure, using pressure sensors (e.g., located at the surface), as at 352, 354. The signals from the pressure sensors may be preprocessed at 356, 358, as shown. The surface dynacard and the processed pressure signals may then be fed to a ML algorithm, as at 360. The ML algorithm may evaluate the surface dynacard in combination with the pressure conditions downhole and may classify conditions, as will be described below, and output a diagnostic code 361 or another output indicating the operation conditions of the beam pumping unit 100 being monitored.

Figure 4A:
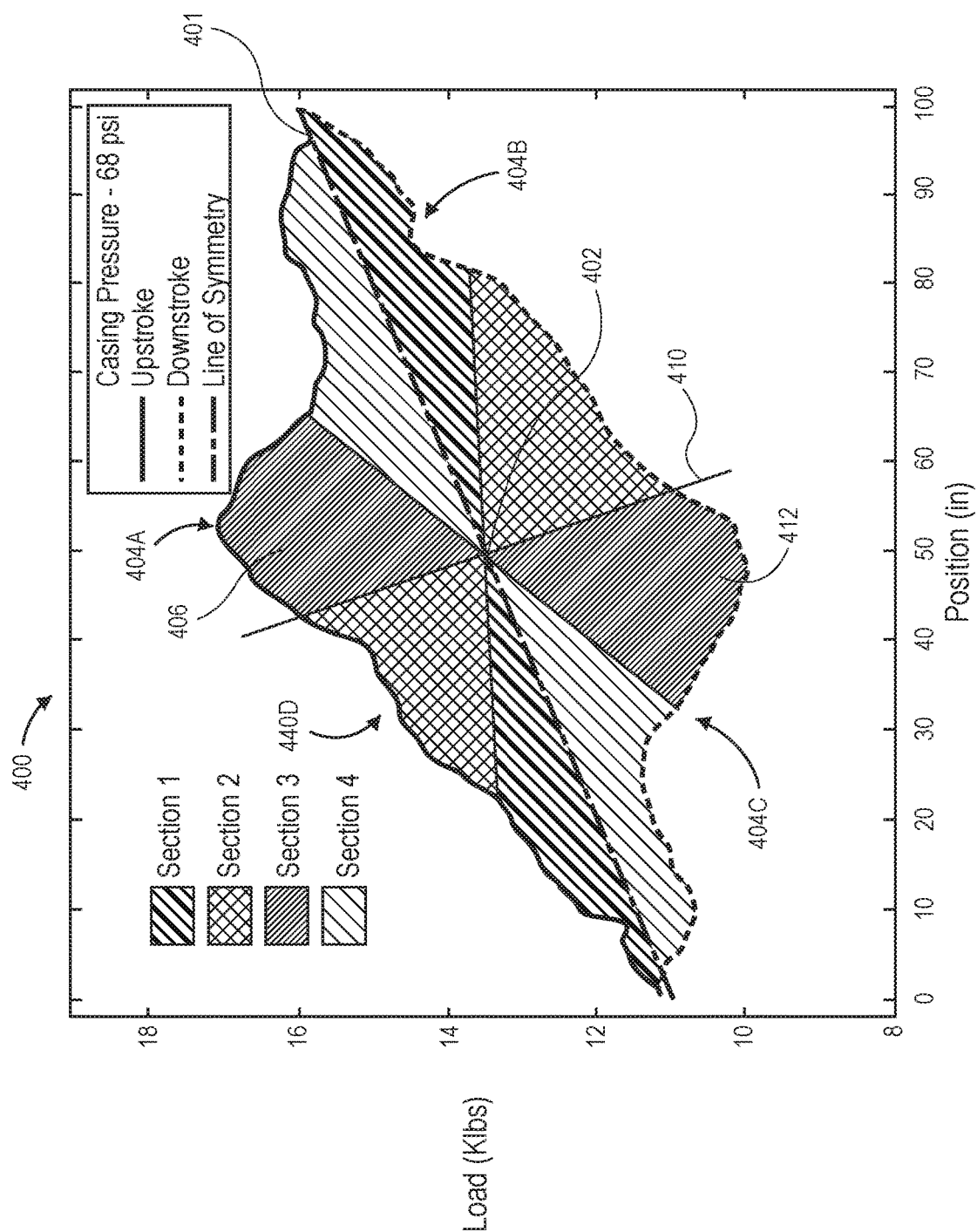
FIG. 4A illustrates a dynamometer card gathered from surface unit data, showing load plotted as a function of position of the rod, according to an embodiment.

FIG. 4A illustrates a surface dynacard 400 of a single pump cycle, according to an embodiment. The dyna-card reflects the load on the pump (e.g., as measured using a load cell) as a function of the position of the pump unit (e.g., as measured using a position sensor). As the pump position is cyclic (up and down), the dynacard 400 reflects a closed shape. In an idealized (or at least optimally working) state, the surface dynacard 400 may be symmetric about a diagonal line of symmetry 401 that passes through a center point 402 (point of symmetry). The closed shape may be partitioned into four sections 404A, 404B, 404C, 404D, each having two parts that correspond on either side of the line of symmetry 401. For example, one part 406 of one section 404A may be flipped about the line of symmetry 401 and flipped again about a line 410 perpendicular to the line of symmetry (the line 410 may also define a line of symmetry in the dynacard 400) to arrive at the other part 412 of the section 404C.

Arc length signatures may be created by computing the difference between the upstroke and downstroke, which are defined about the center point 402. The signatures may be extended by including the pressure and the line of symmetry 401 slope as a first line of data. In addition, there may be two columns included in the signature: first, the difference between the upstroke and the downstoke. In some embodiments, such difference may be scaled from 0 to 1, and second, the unscaled difference between the upstroke and downstroke. The unscaled difference is employed to determine the working condition (e.g., a theoretical, perfect working system will have 0 difference).

Figure 4B:
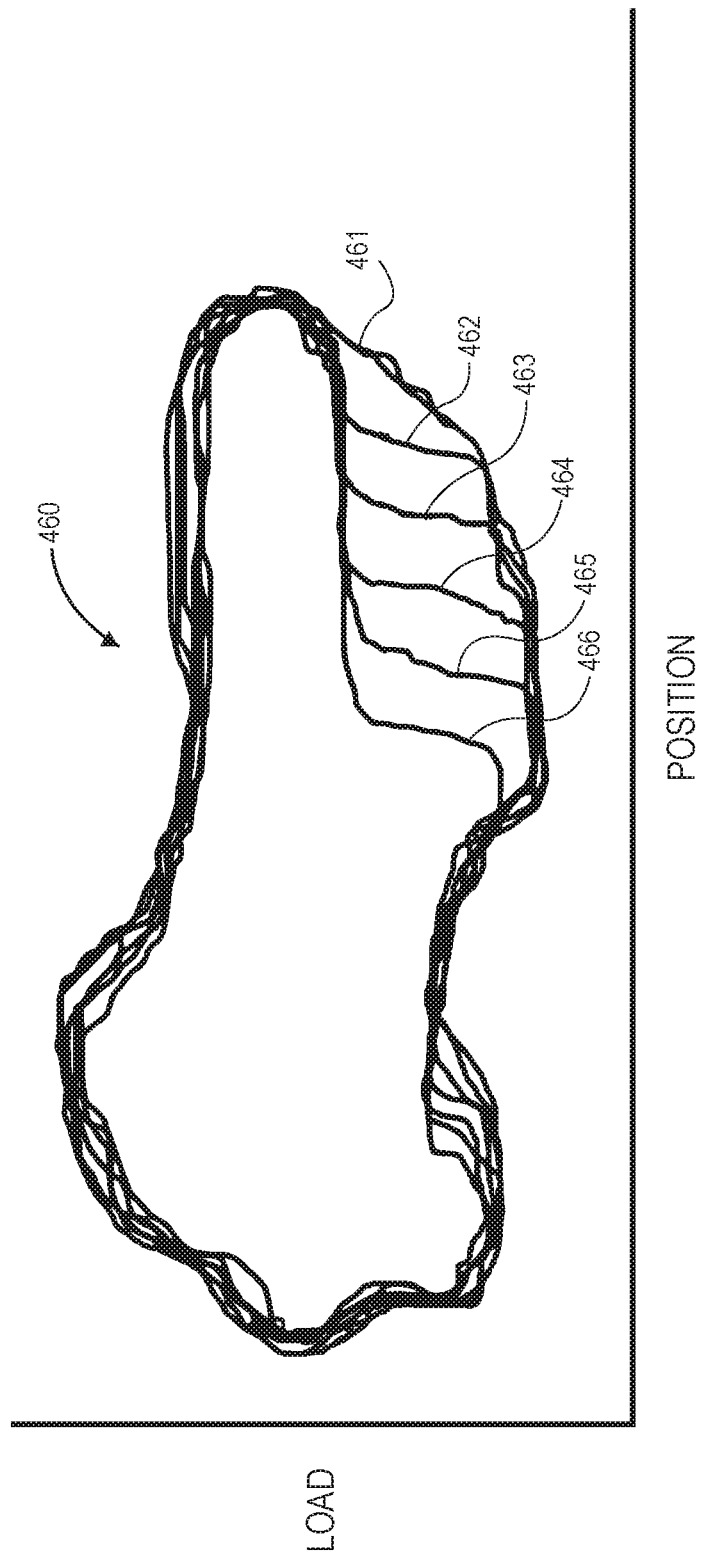
FIG. 4B illustrates a surface dynacard having plots of a plurality of pumping cycles, evidencing a decay in efficiency, according to an embodiment.

FIG. 4B illustrates another surface dynacard 460 of several pump cycles, according to an embodiment. While the pump unit 100 is operating generally without issue, the dynacard 460 may remain generally constant for successive cycles. As the pump unit wears and/or other issues affect efficiency, the dynacard 460 may change, as shown, from nominal at plot 461, to plot 462, 463, 464, 465, 466, etc. This change in dynacard 460 plot shape may thus be an indication of operational issues, and potentially an impeding failure. Thus, one way in which a surface dynacard 460 may signal operation issues is by comparison with past dynacard plots; however, such diagnosis may require that the surface dynacard 460 be plotted over the course of many cycles, so that plots are made both before and after issues arise. Further, it relies on the assumption that the pump unit 100 was operating nominally without issue when plot 461 was made, and, moreover, the plot of nominal operation may vary as between wells, pump units, etc.

Figure 5A:
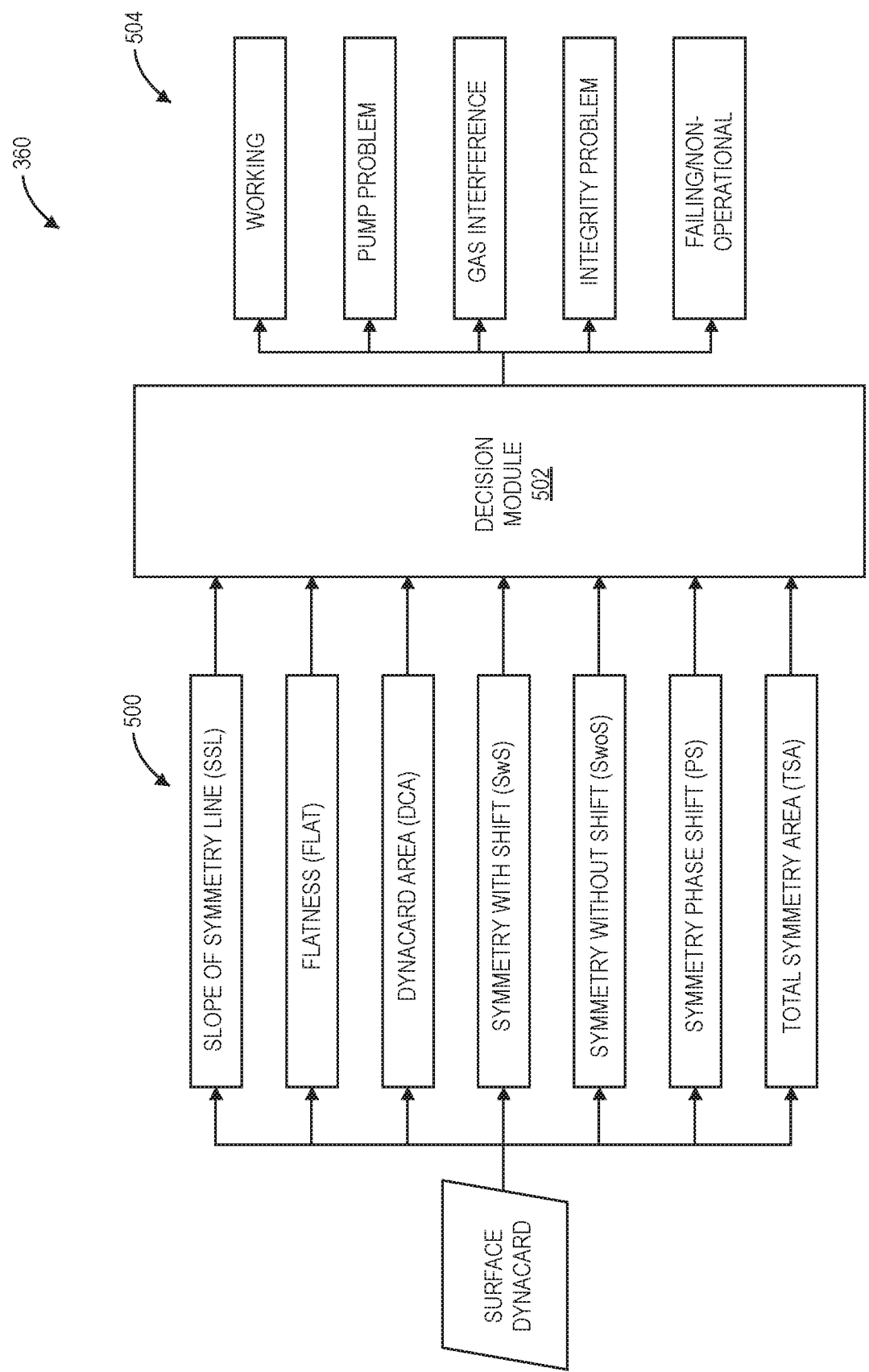
FIG. 5A illustrates a functional block diagram of a system for analyzing a surface dynacard using a machine learning algorithm to diagnose an operating condition and/or a source of inefficiency, according to an embodiment.

FIG. 5A illustrates a functional block diagram of the machine learning algorithm 360 employed as part of the system 330, according to an embodiment. As discussed above, the ML algorithm 360 may receive the surface dynacard 358. From the surface dynacard 358, a plurality of metrics 500 may be determined. The metrics 500 may include, as shown, slope of symmetry line (SSL), flatness (Flat), dynacard area (DCA), symmetry with shift (SwS), symmetry without shift (SwoS), symmetry phase shift (PS), and total symmetry area (TSA). It will be appreciated that these are merely examples and other metrics, or fewer metrics, may be determined. Calculation of these metrics 500 is discussed in greater detail below.

The metrics 500 may then be fed to a decision module 502. The decision module 502 may implement a ML algorithm 360, e.g., a neural network, decision forest, support vector machine, etc., which is trained to identify operating conditions and/or issues based on the metrics 500. Output 504 of the decision module 502 may be one of working, pump problem, gas interference, integrity problem, or failing/non-operational. Other, more specific, operational codes may also be output, as will be discussed below.

Figure 5B:
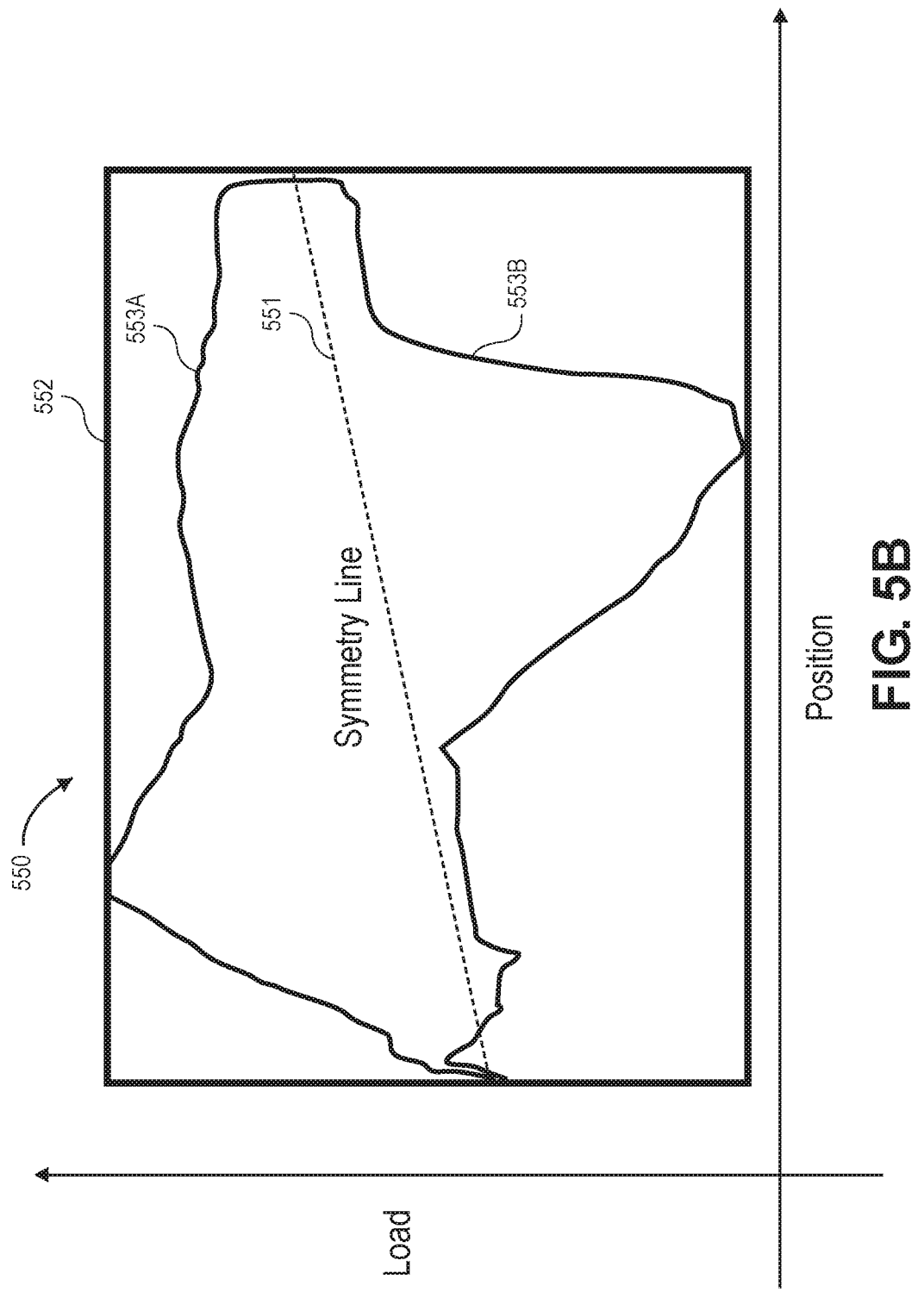
FIG. 5B illustrates a plot of a surface dynacard having a bounding box and symmetry line determined therefrom, according to an embodiment.

FIG. 5B illustrates a surface dynacard 550, according to an embodiment. As shown, the surface dynacard 550 has a line of symmetry 551 and a bounding box 552. The line of symmetry 551 may generally separate an upstroke 553A from a downstroke 553B, describing the movement direction of the polished rod 124 during operation of the beam pump unit 100. The line of symmetry 551 has a slope (SSL). The bounding box 552, as shown, has a height h (vertical) and a width w (horizontal). The flatness (Flat) may be calculated as h/w. The dynacard area DCA may be the area within the dynacard plot.

Figure 5C:
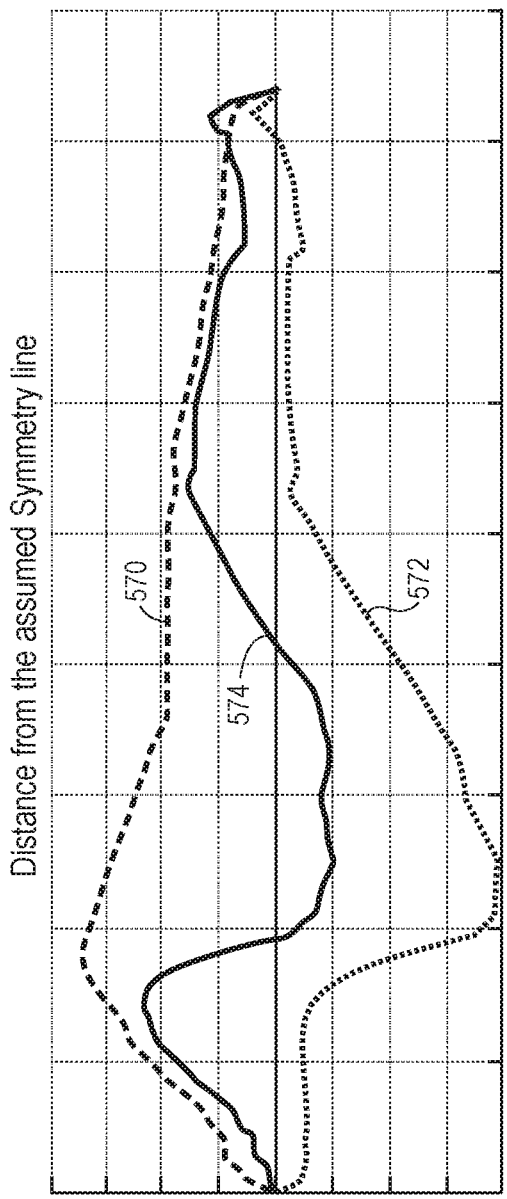
FIG. 5C illustrates a plot of symmetry of the dynacard, e.g., during upstroke and downstroke, according to an embodiment.

FIG. 5C illustrates plots of the upstroke distance from the symmetry line plot 570, downstroke distance from the symmetry line 572, and total symmetry area 574. The downstroke distance plot 572 is reflected horizontally and vertically with respect to the symmetry line 551. Further, the total symmetry area plot 574 which refers to the area between the sum of the plots 570 and 572.

Figure 5D:
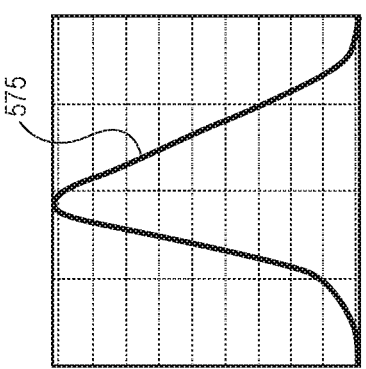
FIG. 5D illustrates a plot of phase shift of the symmetry of the dynacard, according to an embodiment.

FIG. 5D illustrates a plot of phase shift (PS) 575, which is a measure of asymmetry between upstroke and downstroke distances. This distance is calculated based on the cross-correlation of the plots 570, 572.

The compete set of all load-position points for each segmented dynacard is divided into two subsets of upstroke and downstroke points between the terminal position points representing the minimal and maximal position of the polished rod. The symmetry line is calculated using terminal points, and the distance from all points of the dynacard from the symmetry line is calculated. This is dynacard distance function is also split into two segments for upstroke and inverted downstroke. These two subsets are compared by autocorrelation to find the autocorrelation coefficient and the phase shift corresponding to the maximal autocorrelation coefficient. The area within the dynacard is calculated using difference between integrals for upstroke and downstroke loads. The bounding box is drawn around the dynacard and its flatness is calculated as ratio of height and width. The upstroke and downstroke distance area are calculated as well as the difference between them.

Input features that may be employed by the ML algorithm include autocorrelation coefficient between upstroke and inverted downstroke distance functions, maximal autocorrelation coefficient between upstroke and inverted downstroke distance functions, phase shift (in samples) corresponding to the maximal autocorrelation coefficient between upstroke and inverted downstroke distance functions, slope of the symmetry line, flatness of the bounding box which encapsulates the dynacard, distance between the center of the symmetry line and the center of masses of the dynacard, area of the dynacard, area of the upstroke distance function, area of the downstroke distance function, and/or difference between areas of upstroke and downstroke functions Referring to the metrics 500 of FIG. 5A in greater detail, and with more rigorous mathematical definitions, the metrics 500 may be calculated as follows, beginning with the following definitions:

$x_{up}$, $y_{up}$ is a subsequence of (x, y), belonging to the upstroke (from $x_F$ to $x_L$), $x_{dn}$, $y_{dn}$ is a subsequence of (x, y), belonging to the downstroke in reverse order (from $x_L$ to $x_F$), $x_{us}$, $y_{us}$ is an intersection point between symmetry line and upstroke altitude $x_{ds}$, $y_{ds}$ is an intersection point between symmetry line and downstroke altitude $x_F$, $y_F$ is the first point of the upstroke (which is the same as the last point of the downstroke)

$x_L$, $y_L$ is the last point of the upstroke (which is the same as the first point of the downstroke)

Accordingly, the slope of the line of symmetry (SSL) may be calculated as:

$$SSL = m = \frac{y_L - y_F}{x_L - x_F} \quad (1)$$

The other metrics 500 may be calculated as follows:

$$(x_{us,ds})_i = \frac{mx_F + \frac{x_i}{m} + y_i - y_F}{m + \frac{1}{m}}, \quad (2)$$

$$(y_{us,ds})_i = y_i - \frac{x_s - x_i}{m}, \quad (3)$$

$$\text{where } i = \begin{cases} 1 \ldots L \text{ for calculating } x_{us}, y_{us} \\ L \ldots 1 \text{ for calculating } x_{ds}, y_{ds} \end{cases}$$

$$D_{up_i} = -signum[(x_i - x_F)(y_L - y_F) - (y_i - y_F)(x_L - x_F)] \cdot \quad (4)$$
$$\sqrt{((x_i - x_{us})^2 + (y_{us})^2)}$$

$$D_{dn_i} = -signum[(x_i - x_F)(y_L - y_F) - (y_i - y_F)(x_L - x_F)] \cdot \quad (5)$$
$$\sqrt{((x_i - x_{ds})^2 + (y_{ds})^2)}$$

$$D = D_{up_i} + D_{dn_i} \quad (6)$$

$$TSA = (x_2 - x_1) \sum_{i=1}^{L} D_i \quad (7)$$

$$DCA = \int y_{up} dx - \int y_{dn} dx \quad (8)$$

$$\text{Flat} = \frac{\max(y_i)}{\max(x_i)}, i = 1, \ldots 2N \quad (9)$$

$$R_{xy}(m) = \begin{cases} \sum_{n=0}^{N-m-1} -D_{up_{m+n}} D^*_{dn_n}, & m \geq 0 \\ R^*_{yx}(-m), & m < 0 \end{cases} \quad (10)$$

$$c(m) = \frac{R_{xy}(m - N)}{\sqrt{R_{xx}(0) R_{yy}(0)}}, m = 1, 2, \ldots, 2N - 1 \quad (11)$$

$$c_M = \max(c_i), i = 1, \ldots, 2N - 1 \quad (12)$$

$$SwoS = c_0 \quad (13)$$

$$SwS = c_M \quad (14)$$

$$PS = M \quad (15)$$

Figure 6:
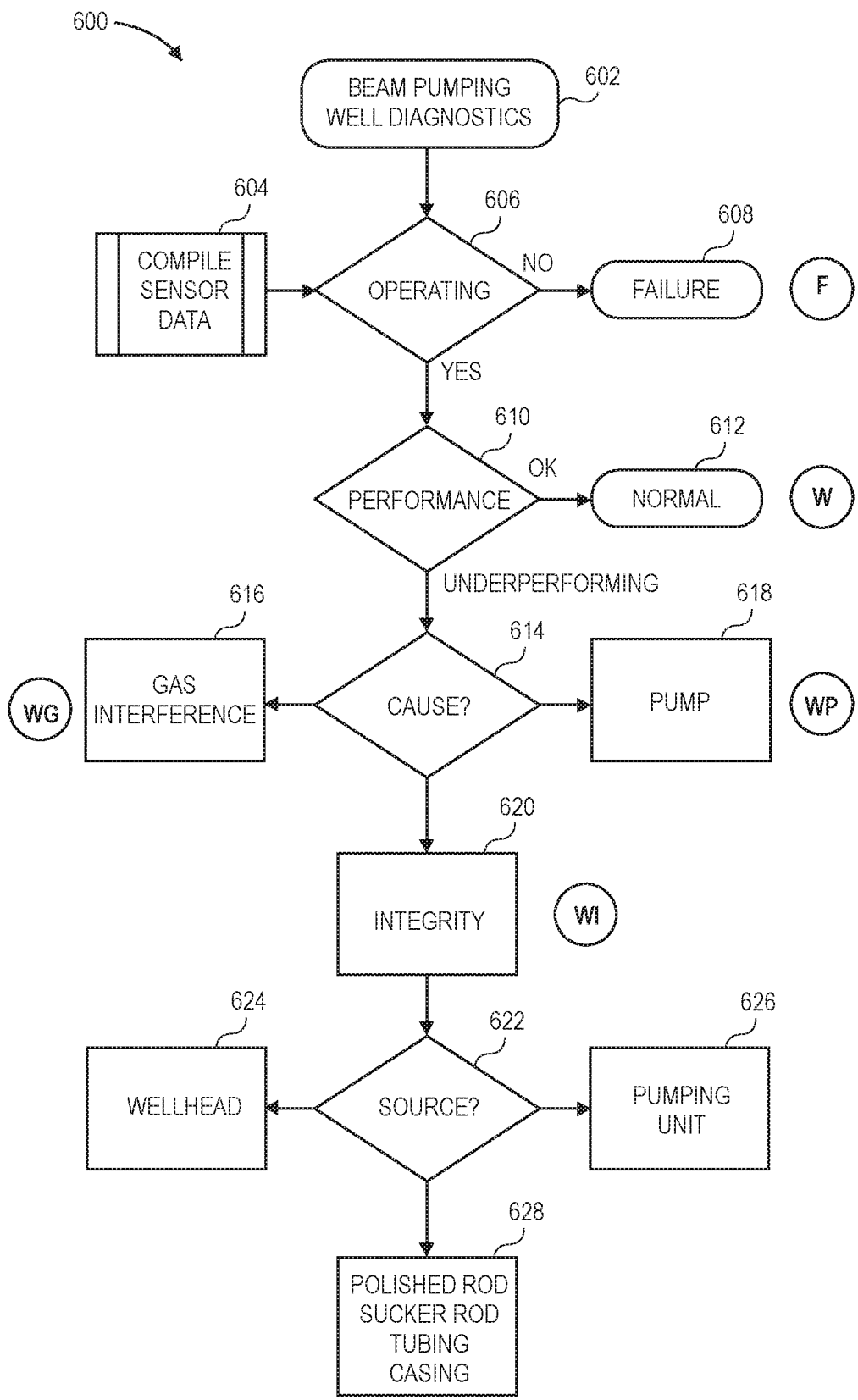
FIG. 6 illustrates a flowchart of a process for diagnosing well pump conditions, according to an embodiment.

FIG. 6 illustrates a flowchart of a process 600 for diagnosing well pump conditions using the surface dynacard (e.g., dynacard 400 and/or 550) and/or downhole conditions such as casing and tubing head pressure, according to an embodiment. The process 600 may begin by receiving sucker rod pump well diagnostics using the integrated sensor 200, as at 602. The process 600 may then compile the sensor data (e.g., create the dynacard), as at 604.

The process 600 may, as a threshold determination, check to ensure the pump unit 100 is operating at all, as at 606. This determination may be made based at least in part on the sensor data. In other embodiments, the determination of whether the pump unit is operating may be based on production flow rates, pressure sensors, visual inspection, etc. If the pump is not operating, as at 608, the conclusion may be a failure condition, and further analysis of load/position data may be unnecessary.

If the beam pump unit is operating, the process 600 may proceed to determining whether the unit is performing normally or underperforming, as at 610. Again, this may be based on the sensor data, or may be based on other sources of data, e.g., pressures, flowrates, etc. If the beam pump unit is not underperforming (i.e., performing normally), the process may conclude by indicating such normal operation and further analysis of the sensor data may not be necessary, as at 612.

If the beam pump is underperforming, the process 600 may proceed to diagnosing the cause of the underperformance, as at 614. The process 600 may employ a machine learning algorithm or another form of artificial intelligence, which may be trained with a training corpus of surface dynacards tagged with specific causes of underperformance. The machine learning algorithm may thus predict causes based on the shape and/or other characteristics of the surface dynacard, without relying on well-specific data. For example, the training corpus used may not include data collected at the specific well pump that is currently being analyzed but may use historical data collected from other pump units at other wells. That is, the specifics of the well pump and its performance may not need to be taken into consideration, as the machine learning algorithm that interprets the sensor data may compare the sensor data to its model and make a prediction about the source of the pump unit underperformance. In some embodiments, the diagnoses made by the machine learning algorithm may be confirmed or denied by a subsequent investigation. Thus, determinations that are confirmed or discarded by the used by the machine learning algorithm to strengthen or weaken connections within the machine learning algorithm, so as to enhance the functioning of the model (e.g., by supervised learning).

Accordingly, the process 600 may determine at 614 whether there are gas interference 616, pump 618, or integrity issues, e.g., based on the surface dynacard metrics 500. If there are gas interference or pump issues, as at 616 or 618, a diagnostic output may be provided, indicating this. If there are integrity issues, the process 600 may proceed to determining a location/source of the integrity issues, based on the sensor data, as at 622. The source may be the wellhead at 624, the pumping unit at 626, or the polished rod/sucker rod 628, to name some examples.

In a specific embodiment, the process 600 may generate a code associated with the source of inefficiency that is determined. For example, 20 or more codes may be selectable based on the specific source/cause of inefficiency. Examples of such codes may be as follows:

TABLE 1

Diagnostic Labels and Definitions

| Class | Description | Definition |
|---|---|---|
| W | Working | Pump is working, no other issues |
|   | Slightly underperforming | Cutoff: pump efficiency > 85% |
| G | Underperforming due to gas interference | Incomplete fillage due to: gas interference, fluid pound |
|   |   | Cutoff: 15% ≤ pump efficiency ≤ 85% |
| P | Underperforming due to subsurface pump issues | Leaking TV, SV; asphaltene in pump, gunk in pump, worn pump |
| I | Underperforming due to current or potential mechanical integrity issues | split tubing, hole in pump, polished rod bending, pump tagging |

TABLE 1-continued

Diagnostic Labels and Definitions

| Class | Description | Definition |
|---|---|---|
| F | Failed to produce (Other than timer-based Shut In due to low productivity of reservoir) Severely underperforming | Parted rods, stuck plunger Cutoff: pump efficiency ≤ 15% Pump-off |

TABLE 2

Detailed Diagnostic Labeling

| Working | Underperforming | | | Fail |
|---|---|---|---|---|
| Working | Pump | Gas | Integrity | Fail |
| W1: Unanchored Tubing | UP1: Asphaltene in Pump | UG1: Average Well | UI1: Rod Parted | F1: Rod Parted |
| W2: Anchored Tubing | UP2: Flumping | UG2: Fluid Pound | UI2: Split Tubing | F2: Deep Rod Part (No plunger) |
| W3: PFL Anomaly | UP3: Gunk in Pump | UG3: Gas Interference | UI3: Leak in Pump | F3: Pump off |
| W4: PFL Gas | UP4: SV Leak | UG4: Deep Well | UI4: Rod Parted | |
| W5: PFL Casing Weight Change | UP5: Leak TV | UG5: Need Gas Separator | | |
| W6: Wellbore Friction | UP6: Trash in TV | | | |
| | UP7: Tag Down Hard | | | |
| | UP8: Tag Unanchored | | | |
| | UP9: Trash in SV | | | |

Based on the particular source of inefficiency identified using the ML algorithm and the surface dynacard, and potentially pressure sensors, the process 600 may include identifying mitigating measures to take to address the source of inefficiency. In some cases, the mitigating measures may include adding a maintenance activity to a list of maintenance activities already scheduled. In some embodiments, the mitigating measure may be to do nothing and continue pumping, e.g., if failure is not imminent and the repair would be uneconomical.

As such, the present process 600 and associated sensors may enable usage of a low power edge computing, e.g., a thin client. Further, the unique features may be extracted from the dynamometer card and may employ class definitions that exceed the mainstream industrial machine learning standards.

Figure 7:
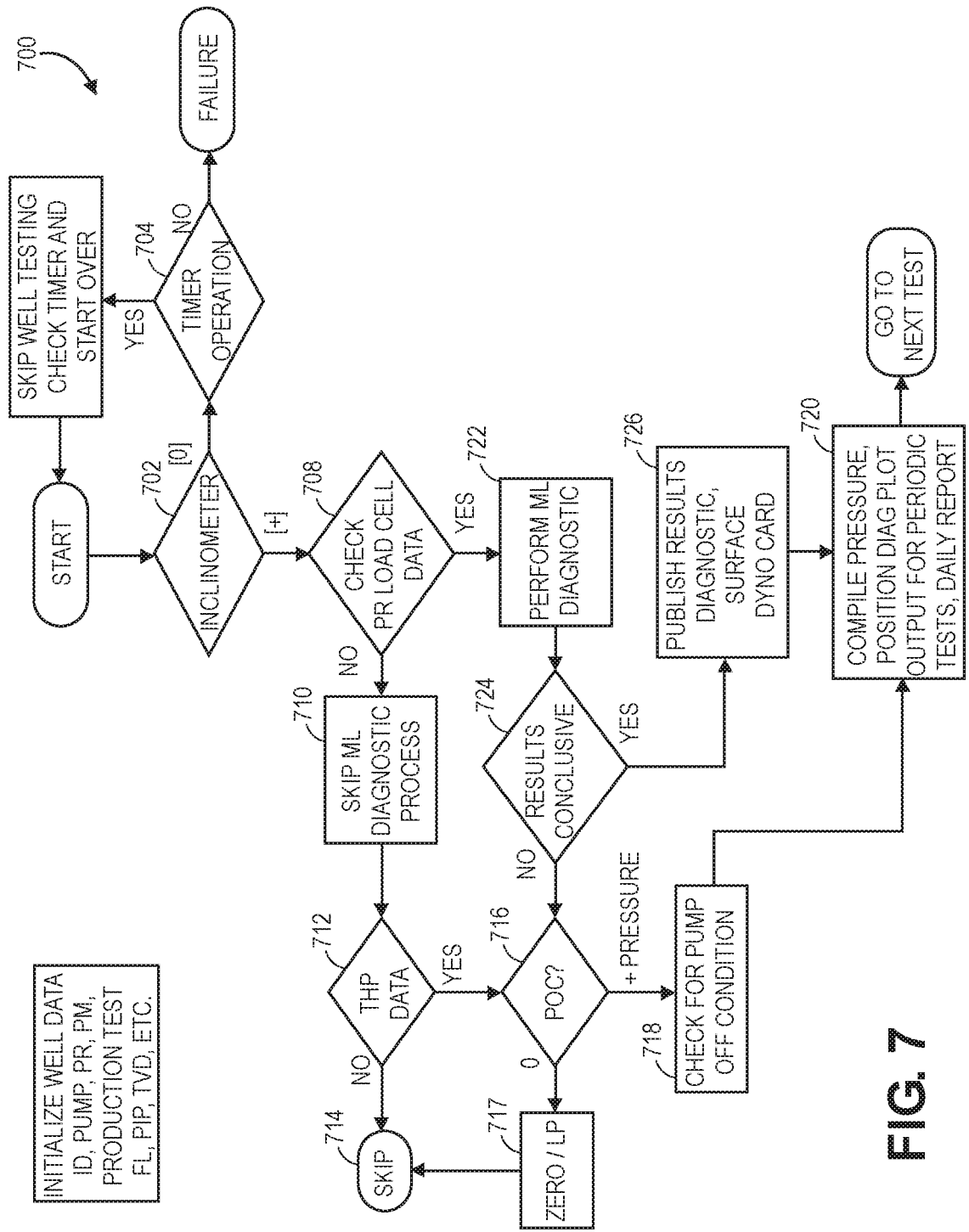
FIG. 7 illustrates a flowchart of another process for diagnosing well pump conditions, according to an embodiment.

FIG. 7 illustrates a flowchart of a method 700 for monitoring a beam pump unit 100 at a well, according to an embodiment. The method 700 may begin by checking for an inclinometer reading, as at 702. If no reading is given, timer operation may be checked, as at 704. If the timer is inoperative, the system is in failure. Otherwise, if the timer is operating, check the timer and start over, as at 706.

If an inclinometer is providing readings, the polished rod load cell data is checked, as at 708. If there is no polished rod load cell data, the machine learning diagnostic process may be skipped, as at 710. Next, tubing head pressure data may be checked, as at 712, and if there is none, the testing is skipped, as at 714. If there is tubing head pressure data, the pump off controller (POC) is checked, as at 716. If it is not receiving pressure data, a zero/low-pressure condition is present, as at 717, and the remainder of the test may be skipped, again as at 714. If it is receiving pressure data, the method 700 proceeds to checking for pump off conditions, as at 718, and then compiles the report, as at 720, as will be described in greater detail below.

Returning to checking for polished rod load cell data at 708, if there is such data, the machine learning diagnostic may be performed using the inclinometer and load cell data, e.g., to create and analyze a surface dynacard, as at 722. If the results from the dynacard analysis are conclusive (i.e., the ML algorithm to diagnose an operating condition or inefficiency issue at a threshold level of confidence), as at 724, they may be published, as at 726 and used to produce the output/report at 720. If not, the tubing head and casing head pressure data may be employed to further verify the pumping conditions, as described above. These data may be combined to produce the report at 720, as described above.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
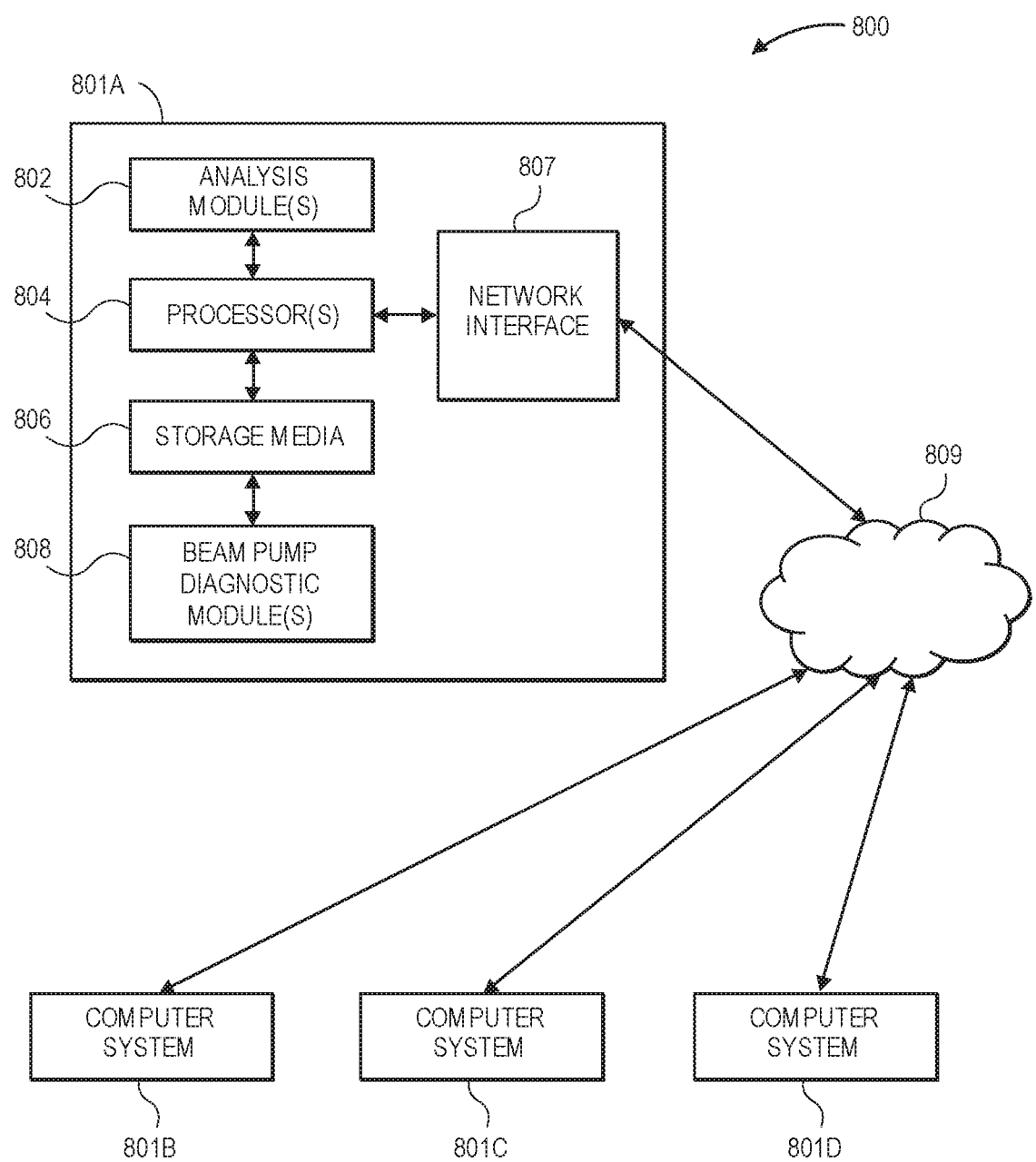
FIG. 8 illustrates a schematic view of a computing system, according to an embodiment.

In some embodiments, any of the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more beam pump diagnostic module(s) 808. In the example of computing system 800, computer system 801A includes the beam pump diagnostic module 808. In some embodiments, a single beam pump diagnostic module may be used to perform some or all aspects of one or more embodiments of the methods. In alternate embodiments, a plurality of beam pump diagnostic modules may be used to perform some or all aspects of methods.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for detecting operational issues in a beam pump unit, comprising:
   receiving sensor data representing a position of and a load on the beam pump unit using a sensor system coupled to the beam pump unit;
   generating a surface dynacard based on the sensor data;
   determining one or more characteristics of the surface dynacard, the one or more characteristics being selected from the group consisting of a slope of a symmetry line of the surface dynacard, a flatness of the surface dynacard, a dynacard area of the surface dynacard, a symmetry with shift of the surface dynacard, a symmetry without shift of the surface dynacard, a symmetry phase shift of the surface dynacard, and a total symmetry area of the surface dynacard;
   predicting a source of inefficiency in the beam pump unit based at least in part on the one or more characteristics of the surface dynacard using a machine learning algorithm;
   identifying one or more corrective actions to take to address the source of inefficiency; and
   generating a report comprising the source of inefficiency, the one or more corrective actions, or both.

2. The method of claim 1, wherein the sensor system is coupled to a polished rod of the beam pump unit.

3. The method of claim 1, wherein the sensor system comprises a gyroscope, a load cell, and an accelerometer, and wherein the sensor data comprises data from the gyroscope, load cell, and accelerometer.

4. The method of claim 1, wherein predicting the source of inefficiency is not based on structural characteristics of the beam pump unit.

5. The method of claim 1, further comprising training the machine learning algorithm using a training corpus of surface dynacards from a plurality of different beam pump units at a plurality of different wells.

6. The method of claim 1, further comprising:
determining if the source of inefficiency predicted is correct; and
adjusting the machine learning algorithm based on whether the source of inefficiency was predicted correctly.

7. The method of claim 1, wherein predicting the source of inefficiency is based at least in part on the one or more characteristics of the surface dynacard.

8. The method of claim 1, further comprising:
determining that the surface dynacard is inconclusive for determining a source of inefficiency in the beam pump unit;
receiving casing head and tubing head pressure data from one or more pressure sensors;
combining the surface dynacard with the pressure data; and
determining the source of inefficiency from the surface dynacard in combination with the pressure data using the machine learning algorithm.

9. The method of claim 8, further comprising determining an operative state of the one or more pressure sensors prior to combining the surface dynacard with the pressure data.

10. The method of claim 1, further comprising checking for pump off conditions prior to determining the source of inefficiency.

11. The method of claim 1, wherein predicting the source of inefficiency in the beam pump unit based at least in part on the surface dynacard comprises:
determining an arc length signature of the beam pump unit based on an asymmetry of the surface dynacard between an upstroke region and a downstroke region thereof, wherein the arc length signature comprises a scaled difference between the upstroke and downstroke regions, and a scaled difference between the upstroke and downstroke regions; and
analyzing the arc length signature.

12. A system, comprising:
a sensor system coupled to a beam pump unit, wherein the sensor system is configured to measure sensor data representing a position of and a load on the beam pump unit during operation thereof;
one or more processors in communication with the sensor system; and
a memory system comprising one or more non-transitory, computer-readable media storing instructions that, when executed by at least one of the one or more processors, cause the system to perform operations, the operations comprising:
receiving the sensor data from the sensor system;
generating a surface dynacard based on the sensor data;
determining that a source of inefficiency in the beam pump cannot be determined based upon the surface dynacard alone;
receiving casing head and tubing head pressure data from one or more pressure sensors;
combining the surface dynacard with the pressure data;
predicting the source of inefficiency in the beam pump unit based at least in part on the combined surface dynacard and pressure data using a machine learning algorithm;
identifying one or more corrective actions to take to address the source of inefficiency; and
publishing the source of inefficiency, the one or more corrective actions, or both.

13. The system of claim 12, wherein the sensor system is coupled to a polished rod of the beam pump unit, and comprises a gyroscope, a load cell, and an accelerometer, and wherein the sensor data comprises data from the gyroscope, load cell, and accelerometer.

14. The system of claim 12, wherein the operations further comprise training the machine learning algorithm using a training corpus of surface dynacards from a plurality of different beam pump units at a plurality of different wells.

15. The system of claim 12, wherein the operations further comprise determining one or more characteristics of the surface dynacard, the one or more characteristics being selected from the group consisting of a slope of a symmetry line of the surface dynacard, a flatness of the surface dynacard, a dynacard area of the surface dynacard, a symmetry with shift of the surface dynacard, a symmetry without shift of the surface dynacard, a symmetry phase shift of the surface dynacard, and a total symmetry area of the surface dynacard, and wherein predicting the source of inefficiency is based at least in part on the one or more characteristics of the surface dynacard.

16. The system of claim 12, wherein predicting the source of inefficiency in the beam pump unit based at least in part on the surface dynacard comprises:
determining an arc length signature of the beam pump unit based on an asymmetry of the surface dynacard between an upstroke region and a downstroke region thereof, wherein the arc length signature comprises a scaled difference between the upstroke and downstroke regions, and a scaled difference between the upstroke and downstroke regions; and
analyzing the arc length signature.

17. A non-transitory, computer-readable medium storing instructions that, when executed by at least one processor of a computing system, cause the computing system to perform operations, the operations comprising:
receiving sensor data representing a position of and a load on a beam pump unit, using a sensor system coupled to the beam pump unit;
generating a surface dynacard based on the sensor data;
predicting a source of inefficiency in the beam pump unit based at least in part on the surface dynacard using a machine learning algorithm, wherein predicting the source of inefficiency comprises:
determining an arc length signature of the beam pump unit based on an asymmetry of the surface dynacard between an upstroke region and a downstroke region thereof, wherein the arc length signature comprises a scaled difference between the upstroke and downstroke regions, and a scaled difference between the upstroke and downstroke regions; and
analyzing the arc length signature;
identifying one or more corrective actions to take to address the source of inefficiency; and
scheduling maintenance to perform the one or more corrective actions.

18. The non-transitory, computer-readable medium of claim 17, wherein the operations further comprise determining one or more characteristics of the surface dynacard, the one or more characteristics being selected from the group consisting of a slope of a symmetry line of the surface dynacard, a flatness of the surface dynacard, a dynacard area of the surface dynacard, a symmetry with shift of the surface dynacard, a symmetry without shift of the surface dynacard, a symmetry phase shift of the surface dynacard, and a total symmetry area of the surface dynacard.

19. The non-transitory, computer-readable medium of claim 17, wherein the operations further comprise:
    determining that the surface dynacard is inconclusive for determining a source of inefficiency in the beam pump unit;
    receiving casing head and tubing head pressure data from one or more pressure sensors;
    combining the surface dynacard with the pressure data; and
    determining the source of inefficiency from the surface dynacard in combination with the pressure data using the machine learning algorithm.

20. The medium of claim 17, wherein the operations further comprise training the machine learning algorithm using a training corpus of surface dynacards from a plurality of different beam pump units at a plurality of different wells.

\* \* \* \* \*